United States Patent
Ben-Dvora et al.

(10) Patent No.: US 7,957,279 B2
(45) Date of Patent: Jun. 7, 2011

(54) SESSION BORDER CONTROL USING MULTIPLE PROCESSORS

(75) Inventors: Nir Ben-Dvora, Herzliya (IL); Jisu Bhattacharya, Fremont, CA (US); Chandrasekar Krishnamurthy, Sunnyvale, CA (US); Doron Oz, Even Yehuda (IL); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 11/755,516

(22) Filed: May 30, 2007

(65) Prior Publication Data

US 2008/0298362 A1   Dec. 4, 2008

(51) Int. Cl.
*H04L 12/28* (2006.01)
*H04L 12/62* (2006.01)

(52) U.S. Cl. ............ 370/230; 370/352; 370/395.2; 709/225; 709/228

(58) Field of Classification Search .......... 370/351–356, 370/522, 329–235, 392, 229–235, 395.2–395.32; 709/238–242, 214–217, 223–229; 726/12, 726/13, 226; 713/153–154, 181; 711/216
See application file for complete search history.

(56) References Cited

U.S. PATENT DOCUMENTS

| | | | | |
|---|---|---|---|---|
| 7,353,276 B2 * | 4/2008 | Bain et al. | ...................... | 709/225 |
| 7,483,992 B2 * | 1/2009 | Bahl | ........................... | 709/228 |
| 7,672,236 B1 * | 3/2010 | Karunakaran et al. | ...... | 370/230.1 |
| 2004/0088424 A1 * | 5/2004 | Park et al. | ...................... | 709/229 |
| 2006/0106941 A1 * | 5/2006 | Singhal et al. | ................. | 709/238 |
| 2006/0112170 A1 * | 5/2006 | Sirkin | ............................ | 709/217 |
| 2008/0159262 A1 * | 7/2008 | Crable et al. | ................... | 370/352 |
| 2008/0282254 A1 * | 11/2008 | Blander et al. | ................ | 718/105 |

OTHER PUBLICATIONS

K. Singh et al, "Failover an Load Sharing in SIP Telephony", IEEE, 2005.*
Singh, et al., Failover and Load Sharing in SIP Telephony, Article, Jul. 2005, pp. 1-11, Department of Computer Science, Columbia University.
Hazlett et al.; "SER—Getting Started"; Chapter 4, Section 2; Feb. 13, 2006; http://siprouter.teigre.com/doc/gettingstarted/ch04s02.html.

* cited by examiner

Primary Examiner — Aung S Moe
Assistant Examiner — Habte Mered
(74) Attorney, Agent, or Firm — Stolowitz Ford Cowger LLP

(57) ABSTRACT

In one embodiment, a router receives a call request for establishing a multimedia exchange between two remote endpoints. The router selects a processing entity to manage a subset of connections with the remote endpoints according to an endpoint identification such as a remote address included in the call request. A different processing entity manages the remaining connections with the remote endpoints. Accordingly, the load of managing signaling for establishing the multimedia exchange is balanced between a plurality of processing elements that appear externally as a single entity such that modification of remote endpoint behavior is not required.

18 Claims, 7 Drawing Sheets

SESSION BORDER CONTROL USING MULTIPLE PROCESSORS

TECHNICAL FIELD

The present disclosure relates generally to the field of networking.

BACKGROUND

Session Border Controllers (SBCs) were introduced to replace back-to-back media gateway pairs allowing native Internet Protocol (IP) interconnects between endpoints located in packets switched networks. SBCs provide a variety of functions including managing signaling for a multimedia session. Conventionally, a centralized processor in a router or other network device running the SBC service manages connections used for exchanging the signaling between the endpoints.

With the continuing evolution of router architecture additional distributed processing elements that are capable of off-loading tasks from the centralized processor (which may become a bottleneck for router performance) have become available. For example, line cards may include one or more processing entities that can offload management from the centralized processor.

Currently available load balancing techniques are not adequate to maximize utilization of these available distributed processing elements during management of signaling. In addition, certain currently available load balancing techniques that attempt to utilize these additional processing elements require modification of endpoint functionality. The disclose that follows solves this and other problems.

DESCRIPTION OF EXAMPLE EMBODIMENTS

Overview

Figure 1:
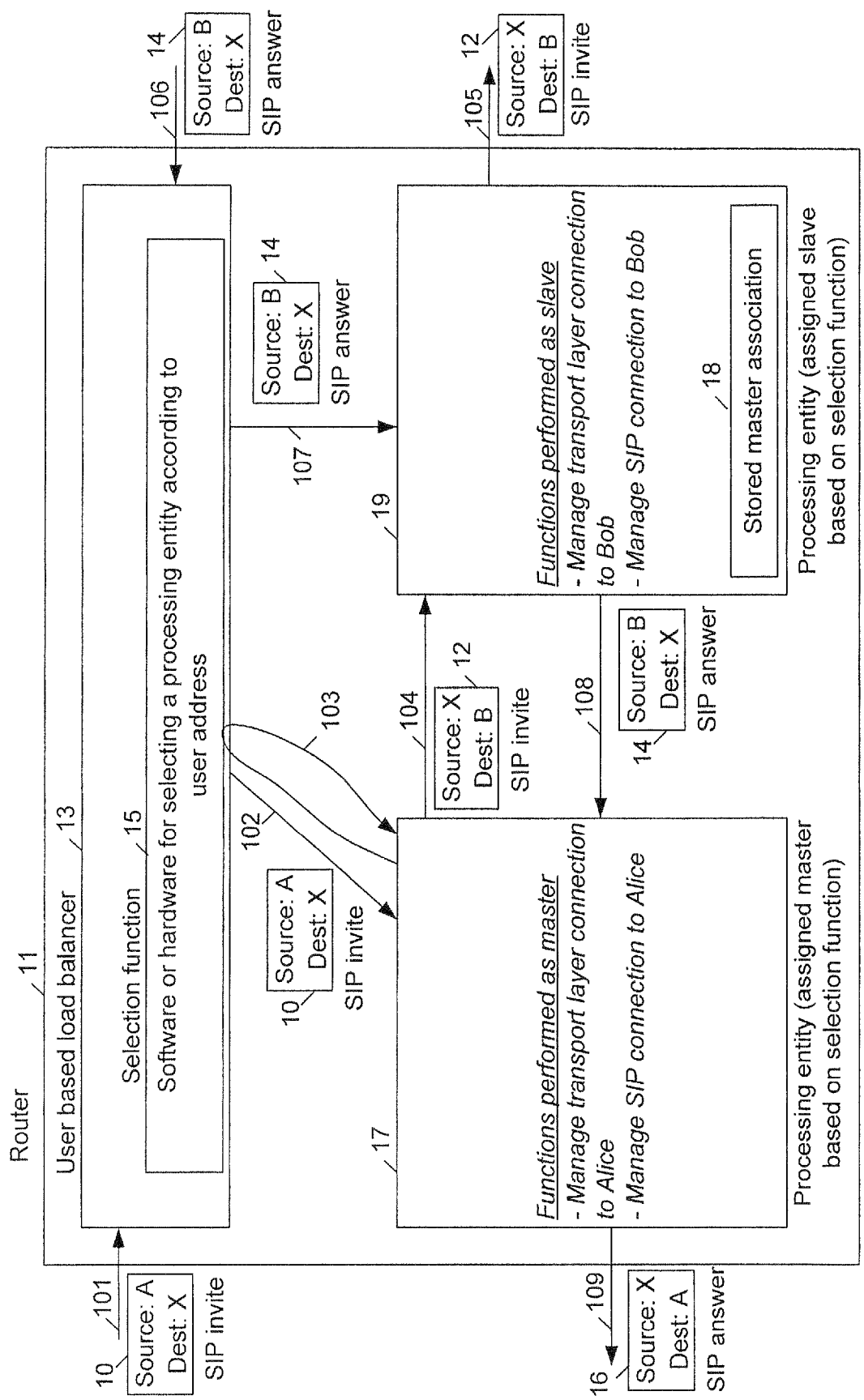
FIG. 1 illustrates an example router utilizing user based load balancing to distribute a call management load over more than one distributed processor.

In one embodiment, a router receives a call request for establishing a multimedia exchange between two remote endpoints. The router selects a processing entity to manage a subset of connections with the remote endpoints according to an endpoint identification such as a remote address included in the call request. A different processing entity manages the remaining connections with the remote endpoints. Accordingly, the load of managing signaling for establishing the multimedia exchange is balanced between a plurality of processing elements that appear externally as a single entity such that modification of remote endpoint behavior is not required.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example router utilizing user based load balancing to distribute a call management load over more than one processor.

The router 11 includes a user based load balancer 13 that is operable to balance management of signaling between a plurality of processing elements located in the router 11. The load balancer 13 includes a hardware or software selection function 15 for selecting between the processing elements according to endpoint information indicating which endpoints (or users) are participants in the multimedia session.

In an example operation, the router 11 receives a signal 101 from originating endpoint Alice (not shown) for establishing a call between remote endpoints Alice and Bob (not shown). A SIP invite 10 includes a source Internet Protocol (IP) address A for the endpoint Alice and a destination IP address X of the Session Border Control (SBC) application running on the router 11. The load balancer 13 analyzes the addressing information included in the SIP invite 10 to identify the endpoint IP address A included in the SIP invite 10. Although in this example the call request 10 is a SIP invite type, in other examples any type of call request may be used including other types of SIP messages and messages sent using other protocols such as H.323.

The identified endpoint address A is then input into the selection function 15. In the present example the selection function 15 is a hash function that receives thirty two (32) bit inputs and outputs eight (8) bit hash values. For example, the hash function substitutes, transposes and otherwise operates on the thirty two bit remote IPv4 address A to generate an eight bit hash value. A table or other mechanism within the router 11 associates different outputted eight bit hash values with different processing entities included in the router 11. For example, in the example router 11 there may be as many as two to the eighth power (2^8) distributed processing entities to select from, although only processors 17 and 19 are shown. The load balancer 13 then uses the outputted hash value to select the processor 17 to receive the SIP invite 10. When the IP addresses are IPv6 address, a hash function with a one hundred and twenty eight (128) bit input should be used. There is no limitation to the input or output bit amounts for the hash function and in other examples and the output may represent any number of processing entities (not only powers of two).

Although the selection function 15 in the present example is a hash function, in other examples any other mechanism for selecting a processor based on an endpoint identification such as an endpoint address may be used. For example, a table may be used to associate different IP addresses with different processing elements included in the router 11.

The selected processor 17 receives signal 102 including the SIP invite 10. The processor 17 is assigned as the master processor 17 in this example because it is the first selected processor for this session. In other examples, any other algorithms can be used to select which processor is master such that the initially selected processor 17 could be assigned the slave for a session. It should be apparent that the processor 17 is dynamically selected as the master for this session based on the endpoint address A and could be selected as a slave in another session. The master processor 17 in this example is also assigned management of both a stateful transport layer connection such as a Transport Control Protocol (TCP) connection to Alice and an application layer connection such as a SIP connection to Alice. In other examples, the master processor 17 may be assigned management of other transport layer connections such as a stateless User Datagram Protocol (UDP) connection, a Stream Control Transmission Protocol (SCTP) connection, etc.

According to the master assignment, the processor 17 generates a new SIP invite 12 identifying the IP address X as the source address and an IP address B for the endpoint Bob as the destination address. The processor 17 then identifies a non-local IP address included in the new SIP invite 12 (this time endpoint address B) and processes the identified endpoint address B using the same hash function 15 or other selection function used previously by the load balancer 13. The input of the endpoint IP address B identifies one of the distributed processing elements in the router 11, such as the processor 19. The signal 103 represents that, in this example, the processor 17 leverages the resources of the load balancer 13 but in other examples the processor 17 may itself process the hash function. Although in this example the hashing function selects processor 19 when fed endpoint address B, in other examples, depending on the hashing function used and the values of the endpoint addresses A and B, it is possible that endpoint address B could also select processor 17 (meaning that this end-to-end call would be managed by the processor 17).

The processor 19 identified according to the other endpoint address B is designated as a slave for this session (note that the processor 19 may be selected as a master processing entity for other sessions). In signal 104 the SIP invite 12 is forwarded to the slave processor 19, which manages the TCP and SIP connections to Bob during the session. Such management includes dealing with packet loss occurring on the connections during the session and managing state. The slave processor 19 may store a master association 18 before forwarding the SIP invite 12 in signal 105.

The router 11 receives back the signal 106 that includes the SIP answer 14 from Bob. The load balancer processes a remote address (IP address B) included in the SIP answer 14 according to the same selection function 15 that was previously used. Since the same IP address B is input into the same selection function 15, the processor 19 is once again identified. Accordingly, the load balancer 13 can provide the SIP answer 14 to a correct one of the many processing entities that may be included in the router 11, which allows the session to continue being established without interruption.

The slave processor 19 receives the SIP answer 14 in signal 107. The slave processor 19 uses any method to identify the master processor 17 for this call. For example, the slave processor 19 may access the stored master association 18. The slave processor 19 then sends the signal 108 including the SIP answer 14 to the master processor 17 for completion of the session initiation between the endpoints using answer path 109 and SIP answer 16.

The processors 17 and 19 manage signaling exchange between the endpoints Alice and Bob according to the previously described division of labor. In other words, the router 11 is able to optimize system resources for higher performance by executing signaling on a single entity. Accordingly, the router 11 achieves the higher performance without requiring the endpoints to adjust their behavior during signaling, e.g. the endpoints continue to address messages to the single IP address X.

Although the user based selection function 15 distributes call requests to processing entities according to remote endpoint addresses, in other embodiments processing entities are selected based on other endpoint identifications such as a value identifying an interface that the call request is received over. Such embodiments still include user based processor selection because different users are connected to different interfaces of the router 11. Port information included in lower layer headers of the received call request may also be used to select a processing entity. Also, as mentioned previously, the user based load balancing may be statically configured without requiring hashing, e.g. the router 11 may alternatively include a table or other mechanism listing preconfigured associations of IP address ranges or interface values to processing entities.

The plurality of processing entities sharing management of the session may be located in a same line card, different line cards, or located in another portion of the router 11 besides the line cards. The processing entities may be located in a single processor package having multiple dies, or different processor packages. The processing entities may be different processor cores in multi-core processors.

The SIP communications may be received over a same interface of the router 11 or over different interfaces of the router 11. For example, several interfaces may be coupled to the load balancer 13 which operates as a multiplexer to forward communications to respective ones of the line cards according to selected processing entities.

In addition to the above described distribution of call signaling management, the processor selected to be the master can handle preventative congestion measures for endpoint Alice (such as Call Admission Control (CAC)). Similarly, the processor selected to be the slave processor can handle preventative congestion measures for the endpoint Bob. When a master-slave arrangement is not used, one of the processing entities that manages a connection for one of the endpoints can similarly handle preventative congestion measures for that endpoint.

Figure 2:
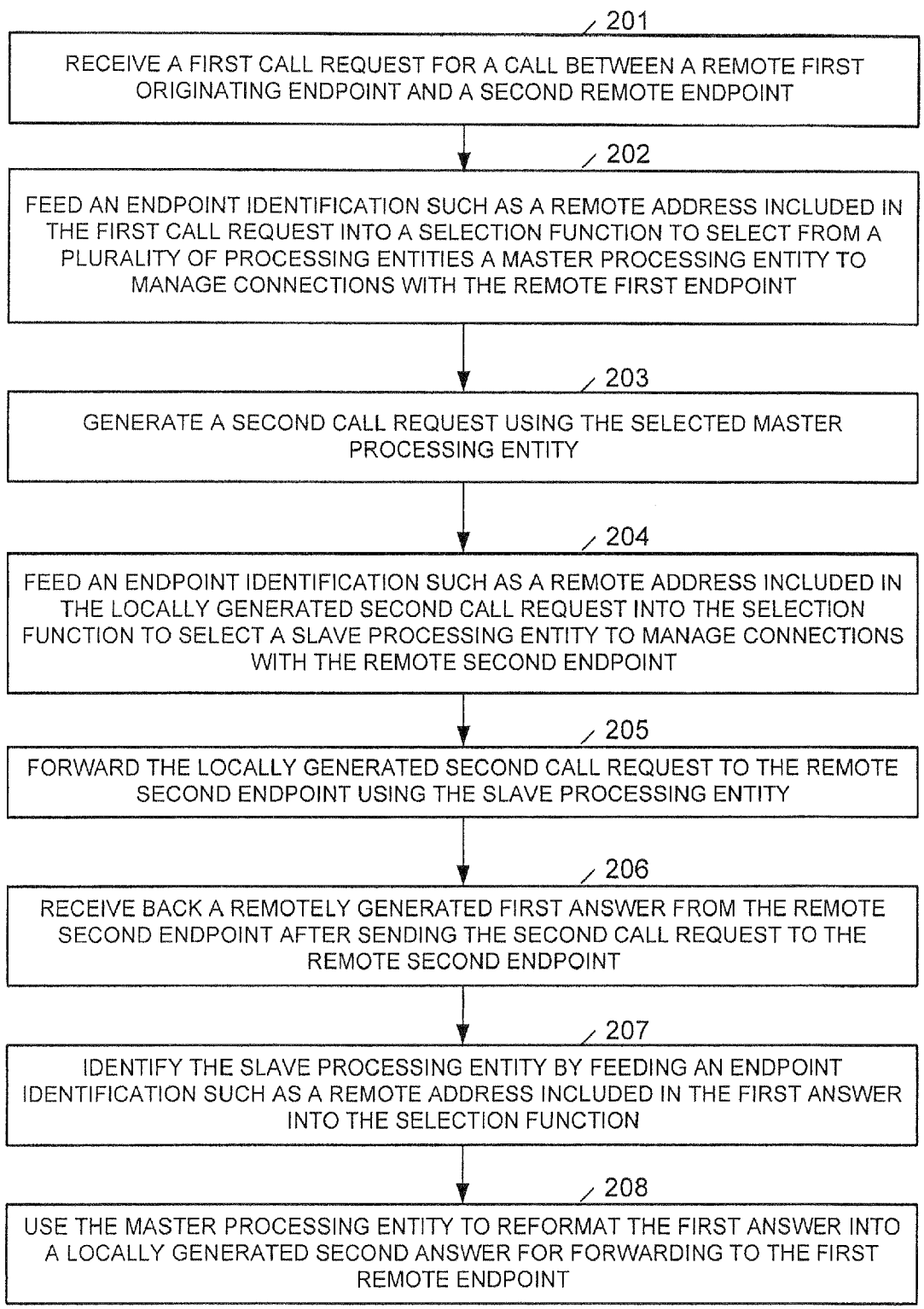
FIG. 2 illustrates an example method for using the router illustrated in FIG. 1.

FIG. 2 illustrates an example method for using the router illustrated in FIG. 1.

In block 201, the router 11 receives a first call request for a call between an originating first remote endpoint and a second remote endpoint. The router 11 then feeds an endpoint identification such as a remote address included in the first call request into a selection function to select from a plurality of processing entities a master processing entity for the requested call in block 202.

In block 203, the router 11 generates a second call request using the selected master processing entity. The router 11 then feeds an endpoint identification such as a remote address included in the locally generated second call request into the selection function to select a slave processing entity to manage connections with the remote second endpoint in block 204. In block 205, the router 11 forwards the locally generated second call request to the remote second endpoint using the slave processing entity.

In block 206, the router 11 receives back a remotely generated first answer from the remote second endpoint after sending the second call request to the remote second endpoint. The router 11 identifies the slave processing entity by feeding an endpoint identification such as a remote address included in the first answer into the selection function in block 207. The router 11 then uses the master processing entity to reformat the first answer into a locally generated second answer for forwarding to the first remote endpoint in block 208.

Using the above method, the SBC is presented externally as a single entity even though the SBC is composed of more than one processor. Accordingly, the above method does not require modification of endpoint behavior during signaling and is generally backwards compatible with conventional endpoints.

Figure 3:
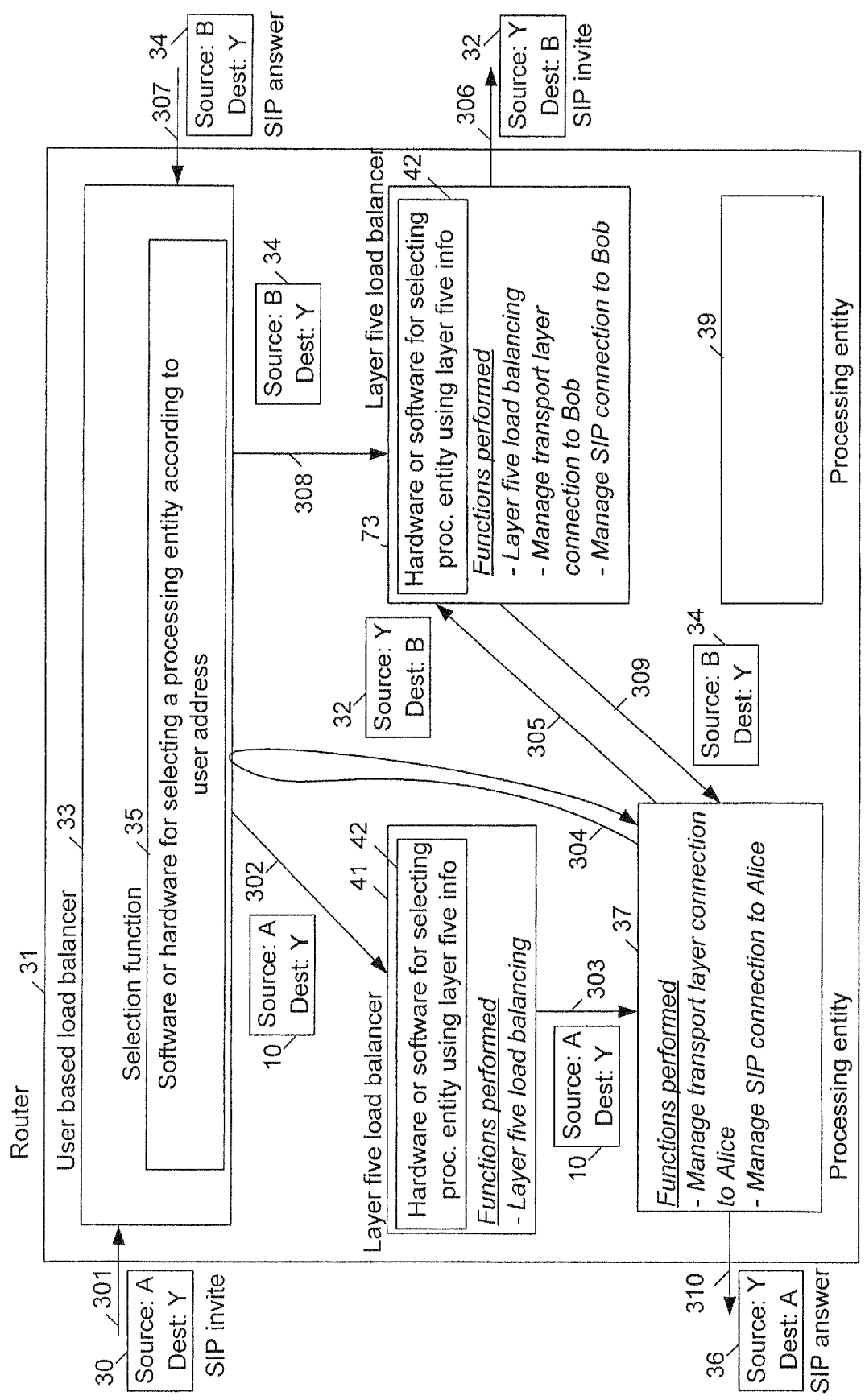
FIG. 3 illustrates another example router utilizing both user based load balancing and layer five load balancing to distribute a call management load over more than one distributed processor.

FIG. 3 illustrates another example router utilizing both user based load balancing and layer five load balancing to distribute a call management load over more than one processor.

The router 31 includes a plurality of layer five load balancers such as balancers 41 and 73 in addition to the user based load balancer 33. Such mixed load balancing is capable of distributing a management load over more processors and accordingly is generally preferred over the non-mixed solution as the number of processing entities available inside a router increases.

The router 31 receives a signal 301 including the SIP invite 30 addressed to an IP address Y associated with the router 31. The load balancer 33 feeds an endpoint IP address A included in the SIP invite 30 into the selection function 35 to select a processing entity to receive the SIP invite 30. The selected processing entity is the layer five load balancer 41, which receives the signal 302 including the SIP invite 30.

In the present embodiment, the load balancer 41 feeds a SIP user identifier included in the SIP invite into the hardware 42 that implements a selection function or other mechanism for selecting from a plurality of processing entities (processors 37 and 39 in this example) based on the SIP user identifier. In other embodiments, the balancer 41 extracts any type of data from a SIP header or other layer five header of the SIP invite 30 for selecting the next processing entity.

The selected processor 37 receives the signal 303 including the SIP invite 30. The processor 37 generates a new SIP invite 32 for sending to the endpoint Bob. The selected processor 37 is also assigned management of the transport and application layer connections to the endpoint Alice. The selected processor 37 then uses the same selection function 35 to identify a different layer five load balancer 73, either by sending the signal 304 to the load balancer 33 or by processing the selection function 35 locally. The processor 37 then sends the signal 305 including the new SIP invite 32 to the selected load balancer 73 for forwarding to the endpoint Bob in signal 306.

The router 31 receives back signal 307 including the SIP answer 34. An endpoint IP address B included in the SIP answer 34 is fed into the same selection function 35 to identify the layer five load balancer 73 that manages the connections to the endpoint Bob.

The layer five load balancer 73 feeds information from the layer five header in the SIP answer 34 received by signal 308 into the same layer five selection function 42 used by the load balancer 41. The load balancer 73 feeds the same type of information into the hardware 42 that was fed by the load balancer 41, such as a SIP user identifier, and accordingly identifies the same processor 37. The load balancer sends the signal 309 forwarding the SIP answer 34 to the identified processor 37 for further processing such as sending the SIP answer 36 using signal 310.

Figure 4:
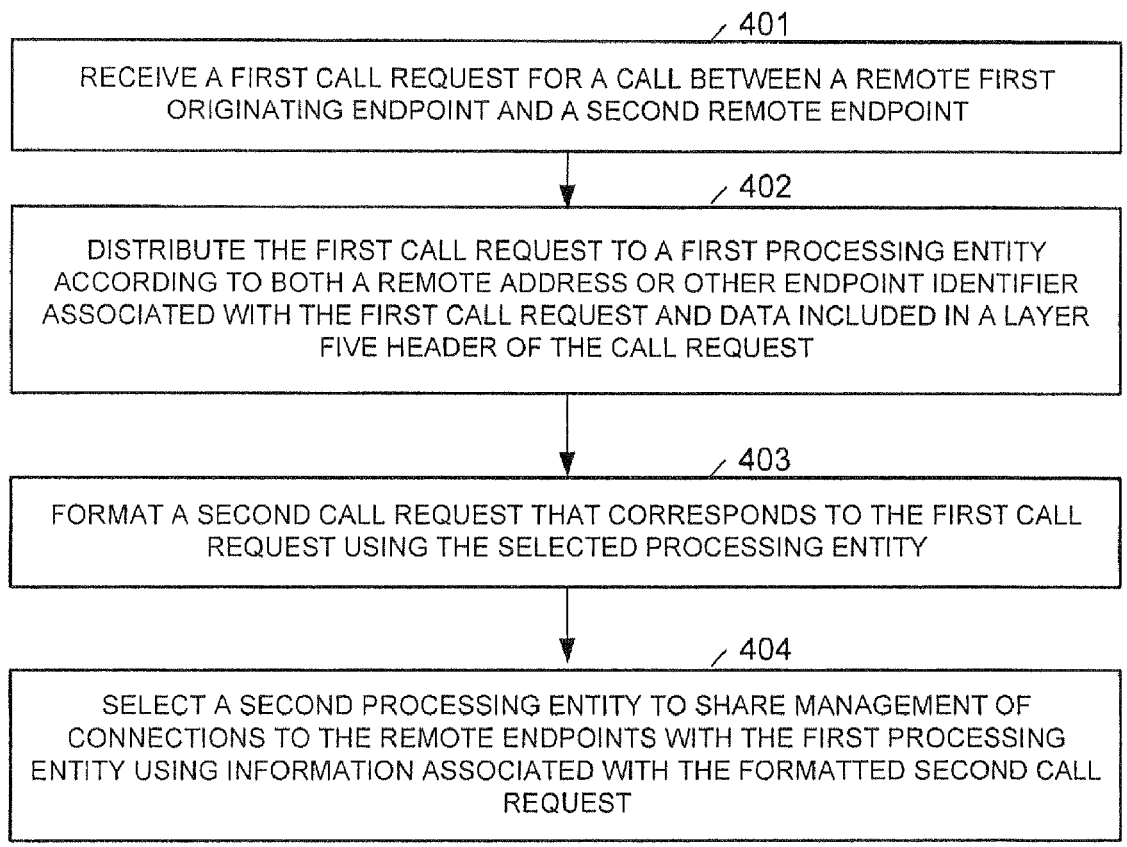
FIG. 4 illustrates an example method for using the router illustrated in FIG. 3.

FIG. 4 illustrates an example method for using the router illustrated in FIG. 3.

In block 401, the router 31 receives a first call request for a call between a remote first originating endpoint and a remote second endpoint. In block 402, the router 31 distributes the first call request to a first processing entity according to both a remote address or other endpoint identifier associated with the first call request and data included in a layer five header of the call request. The router 31 then formats a second call request that corresponds to the first call request using the selected processing entity in block 403.

In block 404, the router 31 selects a second processing entity to share management of connections to the remote endpoints with the first processing entity using information associated with the formatted second call request.

Using the above method, the SBC is presented externally as a single entity even though the SBC is composed of more than one processor. Accordingly, the above method does not require modification of endpoint behavior during signaling and is generally backwards compatible with conventional endpoints.

Figure 5:
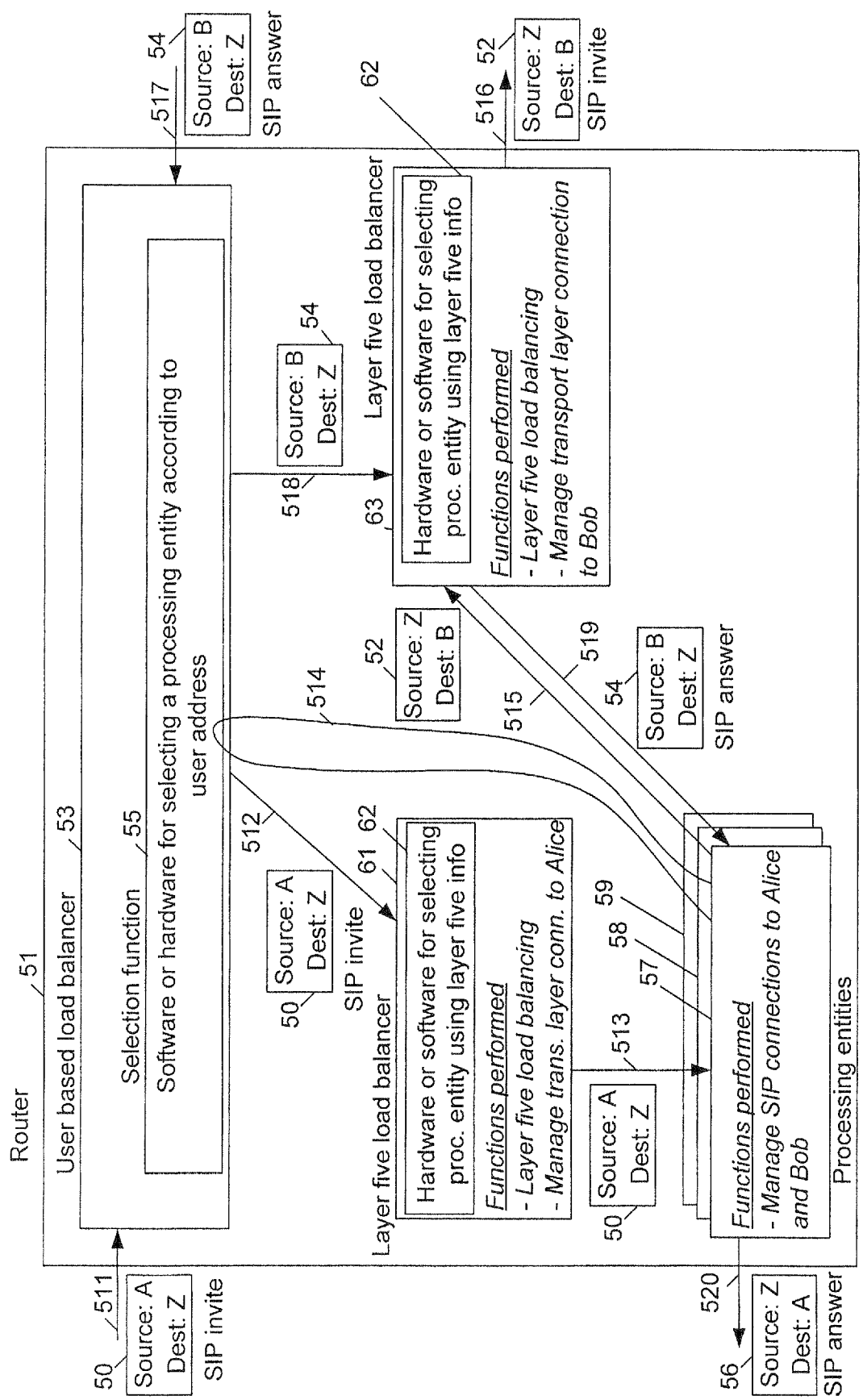
FIG. 5 illustrates yet another example router utilizing both user based load balancing and layer five load balancing to distribute a call management load over more than one distributed processor.

FIG. 5 illustrates yet another example router utilizing both user based load balancing and layer five load balancing to distribute a call management load over more than one distributed processor.

The router 51 receives a signal 511 including a call request such as SIP invite 50 addressed to an IP address Z associated with the router 51. The load balancer 53 selects the processing entity 61 by feeding a remote endpoint address A from the SIP invite 50 into the selection function 55.

The selected layer five load balancer 61 receives the signal 512 and feeds a SIP user identifier or other layer five data from the SIP invite 50 into the function 62 to select from processing entities 57-59. The selected processing entity 57 is responsible for managing SIP connections to Alice and Bob.

The selected processing entity 57 generates a new SIP invite 52 after receiving the signal 513. The selected processing entity 57 then uses the same selection function 55 to identify a different layer five load balancer 63, either by sending the signal 514 to the load balancer 53 or by processing the selection function 55 locally. The signal 515 including the new SIP invite 52 is sent to the selected processing entity 63 that manages the transport layer connection to the endpoint Bob. The selected layer five load balancer 63 sends signal 516 including the SIP invite 52 to the destination address B.

The router 51 selects the layer five load balancer 63 to receive the SIP answer 54 received over signal 517 after feeding the remote endpoint IP address B included in the SIP answer 54 into the selection function 55. Since the same endpoint IP address B is fed into the same selection function 55, the same load balancer 63 is identified. The signal 518 is then sent transferring the SIP answer 54 to the selected load balancer 63.

The layer five load balancer 63 feeds information from the layer five header in the SIP answer 54 into the same layer five selection function 62 used by the load balancer 61. The load balancer 63 feeds the same type of information into the hardware 62 that was fed by the load balancer 61, such as a SIP user identifier, and accordingly identifies the same processor 57. The load balancer 63 sends the signal 519 forwarding the SIP answer 54 to the identified processor 57 for further processing such as sending the SIP answer 56 using signal 520.

During the signaling exchange, the processing entity 61 manages the stateful transport layer connection to Alice, the master processing entity 57 manages the application layer connections to Alice and Bob and the processing entity 63 manages the transport layer connection to Bob. Accordingly, the session management processing load is distributed across a plurality of different processing entities.

Figure 6:
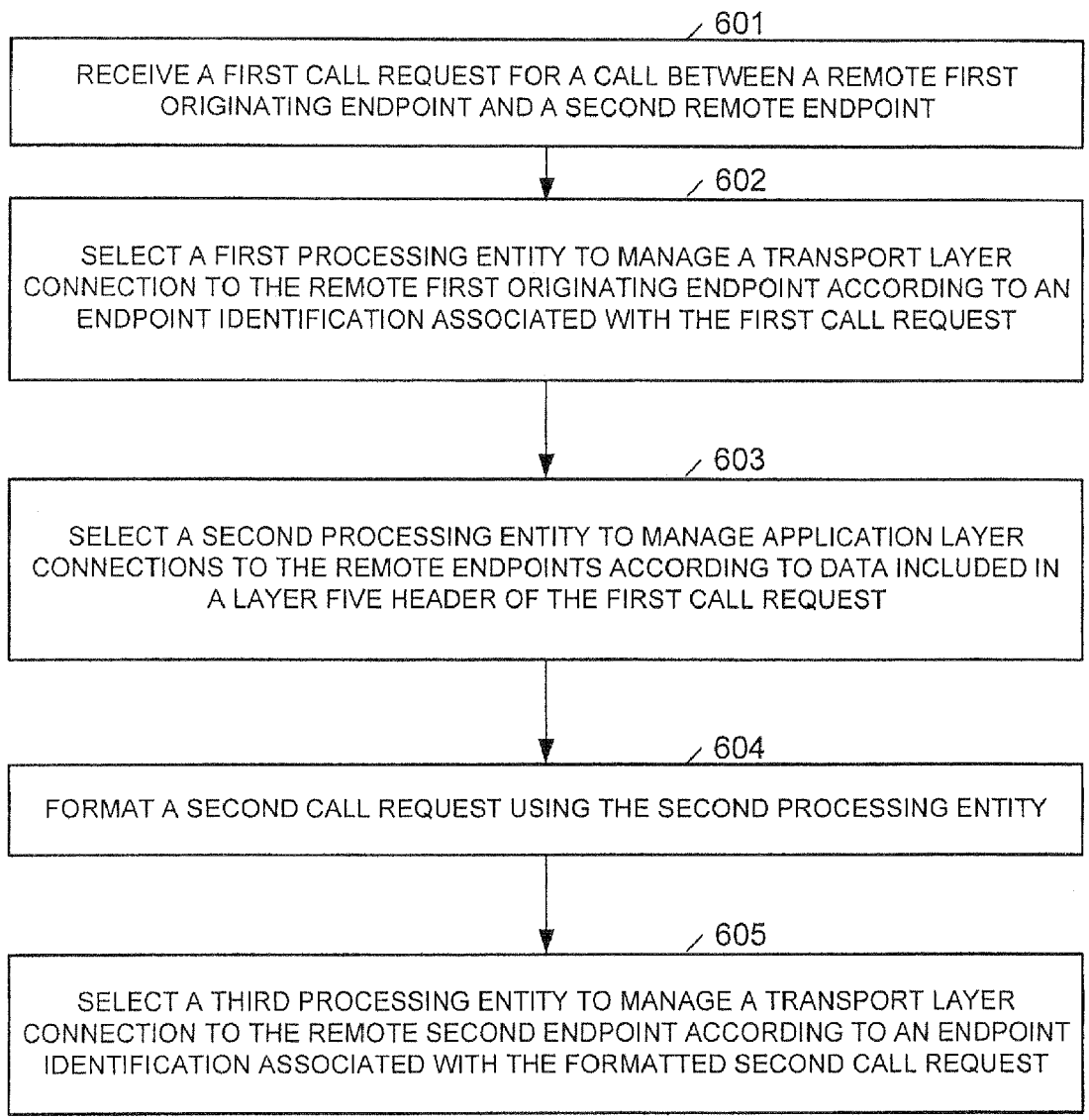
FIG. 6 illustrates an example method for using the router illustrated in FIG. 5.

FIG. 6 illustrates an example method for using the router illustrated in FIG. 5.

In block 601, the router 51 receives a first call request for a call between a remote first originating endpoint and a second remote endpoint. In block 602, the router 51 selects a first processing entity to manage a transport layer connection to the remote first originating endpoint according to an endpoint identification associated with the first call request. In block 603, the router 51 selects a second processing entity to manage application layer connections to the remote endpoints according to data included in a layer five header of the first call request.

The router 51 then formats a second call request that corresponds to the first call request using the second processing entity in block 604. In block 605, the router 51 selects a third processing entity to manage a transport layer connection to the remote second endpoint according to an endpoint identification associated with the formatted second call request.

Using the above method, the SBC is presented externally as a single entity even though the SBC is composed of more than one processor. Accordingly, the above method does not require modification of endpoint behavior during signaling and is generally backwards compatible with conventional endpoints.

Figure 7:
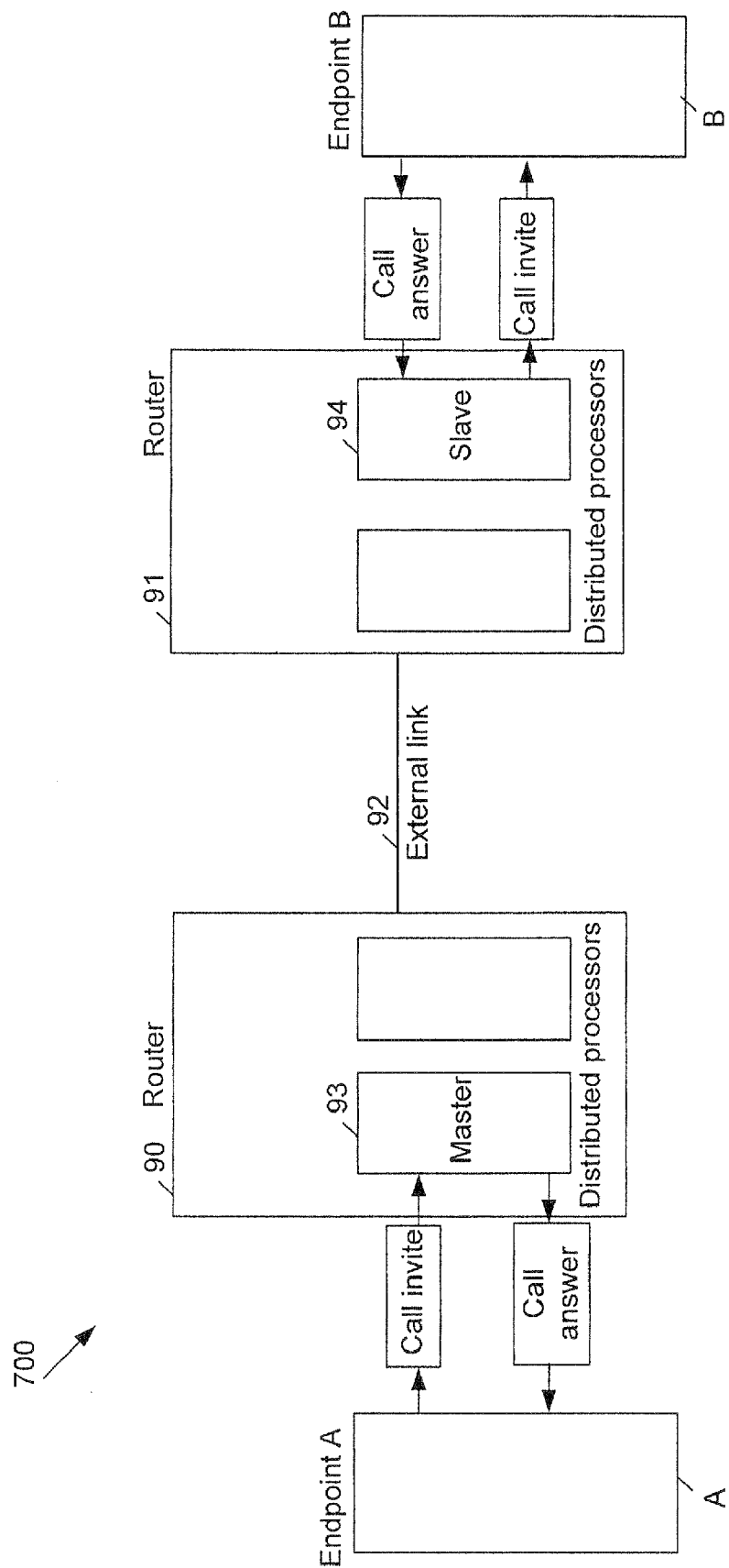
FIG. 7 illustrates an example system for distributing a signaling load across distributed processors belonging to more than one router.

FIG. 7 illustrates an example system for distributing a signaling load across distributed processors belonging to more than one router.

The example system 700 illustrates that the previously described techniques can be used to distribute a signaling load across more than one router such as routers 90 and 91. The system 700 appears to the endpoints A and B as a single entity when the previously described techniques are used to distribute the signaling load across distributed processors 93 and 94, and accordingly, the endpoints A and B may be conventional endpoints. The processor 93 selected to be master and the processor 94 selected to be slave exchange messages over the external link 92 in this example instead of an internal link as in the previous examples. Although an example utilizing a master-slave relationship is shown in the multi-router system 700, any of the previously described techniques for distributing management of a signaling load can use processors distributed amongst more than one router or other network device.

Several preferred examples have been described above with reference to the accompanying drawings. Various other examples of the invention are also possible and practical. The system may be exemplified in many different forms and should not be construed as being limited to the examples set forth above. For example, the system described above can be used in non-SBC-capable devices such as a gateway located between a packet switched network and a circuit switched network. Similarly, the system described above can be used in any network devices managing a call between two endpoints. Similarly, the techniques described herein for use with SIP can be generalized to other call signaling methods besides SIP such as H.323.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
 a processing device; and
 a memory coupled to the processing device comprising instructions executable by the processing device, the processing device operable when executing the instructions to:
 receive a call request for a stateful multimedia session between an origination endpoint and a termination endpoint;
 select a first processing entity to manage a first connection extending from the apparatus to the origination endpoint, wherein the first connection is for the stateful multimedia session, wherein said selection of the first processing entity is based on a source address of a signaling message from the origination endpoint;
 select a second different processing entity to manage a second connection extending from the apparatus to the termination endpoint, wherein the second connection is for the same stateful multimedia session, wherein said selection of the second different processing entity is based on a source address of a signaling message from the termination endpoint; and
 statefully process the requested multimedia session according to the selections.

2. The apparatus of claim 1, wherein the processing device is further operable to:
 input a remote address included in the call request into a hash function; and
 select the second processing entity for transmitting the call request based on an output of the hash function.

3. The apparatus of claim 2, wherein the processing device is further operable to input the source address of the signaling message from the termination endpoint into the same hash function to identify the second processing entity.

4. The apparatus of claim 3, wherein the first and second processing entities respectively manage the first and second connections by responding to packet loss associated therewith.

5. The apparatus of claim 1, wherein the first processing entity manages application layer connections with the origination and termination endpoints and the second processing entity manages a transport layer connection with the termination endpoint.

6. The apparatus of claim 5, wherein the processing device is further operable to select a third processing entity to manage a stateful connection with the origination endpoint.

7. The apparatus of claim 1, wherein the statefully processed multimedia session is conducted according to the Session Initiation Protocol (SIP).

8. The apparatus of claim 1, wherein the processing device is operable to load-balance signaling for the requested statefully processed multimedia session between the processing entities that are separate from a centralized processor for the apparatus without requiring the originating and terminating remote endpoints to use more than one address when addressing messages for transfer to the apparatus.

9. A method, comprising:
distributing incoming first and second signaling messages for a statefully processed media exchange session to a plurality of different processors of a network device, the first signaling message from an originating endpoint of the statefully processed media exchange session for a first connection extending between the network device and the originating endpoint, the second signaling message from a terminating endpoint of the statefully processed media exchange session for a second connection extending between the network device and the terminating endpoint;
wherein the first signaling message of the statefully processed media exchange session is distributed to a different one of the processors than the second signaling message of the same statefully processed media exchange session, and wherein said distribution to different processors is based on different source addresses of the incoming signaling messages;
establishing connections extending between the processors and the originating and terminating endpoints for facilitating signaling that establishes the statefully processed media exchange session; and
exchanging messages between the different processors for balancing management of the connections between different ones of the processors.

10. The method of claim 9, comprising:
selecting from the processors a master processing entity for the statefully processed session; and
selecting from the processors a slave processing entity for the statefully processed session, the slave processing entity forwarding received signaling to the master processing entity.

11. The method of claim 9, further comprising:
hashing the source addresses to identify hash values; and
comparing the hash values to processor identifications to select between the processors before distributing the incoming signaling messages to the processors.

12. The method of claim 9, wherein the statefully processed session is conducted according to the Session Initiation Protocol (SIP).

13. The method of claim 9, wherein the originating and terminating endpoints address signaling of the statefully processed media exchange session to a same address and wherein said signaling address to the same address is provided to different processors of the network device.

14. An apparatus, comprising:
a processing device; and
a memory coupled to the processing device comprising instructions executable by the processing device, the processing device operable when executing the instructions to:
distribute incoming first and second signaling messages for a statefully processed media exchange session to a plurality of different processors of a network device, the first signaling message from an originating endpoint of the statefully processed media exchange session for a first connection extending between the network device and the originating endpoint, the second signaling message from a terminating endpoint of the statefully processed media exchange session for a second connection extending between the network device and the terminating endpoint;
wherein the first signaling message of the statefully processed media exchange session is distributed to a different one of the processors than the second signaling message of the same statefully processed media exchange session, and wherein said distribution to different processors is based on different source addresses of the incoming signaling messages;
establish connections extending between the processors and the originating and terminating endpoints for facilitating signaling that establishes the statefully processed media exchange session; and
exchange messages between the different processors for balancing management of the connections between different ones of the processors.

15. The apparatus of claim 14, wherein for the statefully processed session a first layer five connection extending between the network device and the originating endpoint is managed by a different one of the processors than a second layer five connection extending between the network device and the terminating endpoint.

16. The apparatus of claim 15, wherein one of the processors that manages the layer five connections is a master processing entity and the other one of the processors that manages the layer five connections is a slave processing entity that forwards received signaling for the statefully processed session to the master processing entity.

17. The apparatus of claim 14, wherein the source addresses are Internet Protocol (IP) addresses.

18. The apparatus of claim 14, wherein the received first signaling message is addressed to a same destination address as the second signaling message, wherein the first and second signaling messages are provided to the different processors of the network device.

* * * * *